US012612946B2

(12) United States Patent
Kinion

(10) Patent No.: US 12,612,946 B2
(45) Date of Patent: Apr. 28, 2026

(54) EAXLE WITH SNAP RING AND PRESS-FIT RETAINER FOR BEARING

(71) Applicant: Schaeffler Technologies AG & Co. KG, Herzogenaurach (DE)

(72) Inventor: David Kinion, Cuyahoga Falls, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 61 days.

(21) Appl. No.: 18/749,780

(22) Filed: Jun. 21, 2024

(65) Prior Publication Data

US 2025/0389299 A1      Dec. 25, 2025

(51) Int. Cl.
| | |
|---|---|
| *F16C 35/077* | (2006.01) |
| *F16C 19/52* | (2006.01) |
| *F16C 35/067* | (2006.01) |

(52) U.S. Cl.
CPC .......... *F16C 35/077* (2013.01); *F16C 19/525* (2013.01); *F16C 35/067* (2013.01); *F16C 2202/22* (2013.01)

(58) Field of Classification Search
CPC .... F16C 19/525; F16C 35/067; F16C 35/077; F16C 2202/22; F16B 21/183; F16B 21/186
See application file for complete search history.

(56) References Cited

U.S. PATENT DOCUMENTS

| | | | | |
|---|---|---|---|---|
| 3,994,544 | A * | 11/1976 | Flatland | F16C 19/06 |
| | | | | 384/488 |
| 5,841,209 | A * | 11/1998 | Appeldorn | B66F 9/07586 |
| | | | | 310/91 |
| 11,400,803 | B1 * | 8/2022 | Zhang | F16H 57/0472 |
| 2014/0116167 | A1 * | 5/2014 | Aizawa | F16C 33/1075 |
| | | | | 74/89.17 |
| 2017/0190216 | A1 * | 7/2017 | Schick | F16C 19/26 |
| 2021/0231155 | A1 * | 7/2021 | Linz | F16B 21/186 |
| 2023/0396118 | A1 * | 12/2023 | Linz | B60K 6/485 |
| 2024/0133413 | A1 * | 4/2024 | Deneszczuk | F16C 35/063 |
| 2024/0235337 | A1 * | 7/2024 | Margraf | H02K 11/40 |

FOREIGN PATENT DOCUMENTS

| | | | | | |
|---|---|---|---|---|---|
| JP | | H07217624 A | * | 8/1995 | |
| JP | | 2009174558 A | * | 8/2009 | F16C 35/067 |
| WO | WO-2016040831 A1 | | * | 3/2016 | F16C 21/00 |

OTHER PUBLICATIONS

Machine Translation of JP-H07217624-A (Year: 1995).*
Machine Translation of JP-2009174558-A (Year: 2009).*

* cited by examiner

*Primary Examiner* — Alan B Waits
(74) *Attorney, Agent, or Firm* — Volpe Koenig

(57) ABSTRACT

An assembly, which may be a gear box, differential or eAxle assembly, having a housing with a bearing seat and a snap ring groove, and a rolling bearing located on the bearing seat adjacent to the snap ring groove. A snap ring is located in the snap ring groove, with the snap ring extending radially along a portion of the rolling bearing. A press-fit retainer is engaged to the housing with a press-fit on an axially opposite side of the snap ring from the rolling bearing to support the snap ring. An assembly method is also provided.

15 Claims, 2 Drawing Sheets

EAXLE WITH SNAP RING AND PRESS-FIT RETAINER FOR BEARING

TECHNICAL FIELD

The disclosure relates gearbox assemblies where an axial load may be transmitted to a shaft, and more particularly to electric axles (eAxles) for motor vehicles.

BACKGROUND

In general, eAxles are known structures that may be used in electric vehicles. eAxles typically include an electric motor and power transmission components integrated into an axle assembly for transmitting torque from the electric motor to the wheels of the vehicle. The power transmission components can include the electric motor (emotor) one or more gear stages, a differential, and axles.

The space envelope for components in eAxles is limited. Additionally, rotating components in eAxles are mounted using rolling bearings. Due to limited spacing for components, any axial movement or shifting of components, for example due to movement of locating bearings under certain load conditions, can result in failure. For example, axial loads may be induced by helical gears into the associated shafts and locating bearings due to certain slip-grab conditions occurring, where a slipping tire suddenly engages a road surface in a non-slipping manner—and the impulse load is carried back through the rotating components, sometimes referred to as "Ice Clunk". Here, the axial loads can cause unwanted displacement or deflection of certain parts.

It would be desirable to provide an arrangement that uses little space and addresses this issue.

SUMMARY

In one aspect, an assembly, which may be a gear box, differential or eAxle assembly, is provided having a housing with a bearing seat and a snap ring groove, and a rolling bearing located on the bearing seat adjacent to the snap ring groove. A snap ring is located in the snap ring groove, with the snap ring extending radially along a portion of the rolling bearing. A press-fit retainer is engaged to the housing with a press-fit on an axially opposite side of the snap ring from the rolling bearing to support the snap ring.

In one embodiment, the press-fit retainer is annular and includes a side wall that extends above the bearing seat. The side wall has a radial height that extends at least 50% of a radial height of an outer bearing ring, and in some embodiments extends at least 70% of a radial height of an outer bearing ring, and may extend 100% of the radial height or more.

In one embodiment, the snap ring has an end face that includes a chamfer, with the chamfer being received in the snap ring groove. Here, the side wall of the press-fit retainer has a radial height that extends radially inwardly past a chamfer end point where the chamfer reaches a radial plane of the end face so that the press-fit retainer radially overlaps the chamfer end point at all times.

With this arrangement, unwanted axial movement of the shaft that can be caused by deflection or bending of the retaining ring due to axial loading of the shaft are avoided based on the additional press-fit retainer.

In one embodiment, the press-fit retainer is made of aluminum or an aluminum alloy. Other suitable metals could also be used.

In one embodiment, a shaft is supported by the rolling bearing. In the application for an eAxle assembly, the housing is an emotor housing, and the shaft supports a rotor of the emotor.

In one embodiment, the press-fit retainer has a coefficient of thermal expansion that is equal to or greater than a coefficient of thermal expansion of the rolling bearing and the housing. This ensures that the press-fit retainer is held in place during operation of the eAxle.

In one embodiment, where the application is an eAxle assembly, the housing is a center housing that contains an emotor and is connected to at least one of a differential housing or an axle housing.

In another aspect, a method of assembling an eAxle is provided. The method includes the steps of:

providing a housing having a bearing seat and a snap ring groove;

installing a rolling bearing on the bearing seat adjacent to the snap ring groove;

installing a snap ring in the snap ring groove, the snap ring extending radially along a portion of the rolling bearing; and press-fitting a press-fit retainer into the housing with a press-fit on an axially opposite side of the snap ring from the rolling bearing to support the snap ring.

The method can optionally further include one or more of the following:

A) the press-fit retainer is annular and includes a side wall that extends above the bearing seat;

B) the side wall having a radial height that extends at least 50% of a radial height of an outer bearing ring;

C) the side wall having a radial height that extends at least 70% of a radial height of an outer bearing ring;

D) the press-fit retainer is made of aluminum or an aluminum alloy;

E) supporting a shaft by the rolling bearing;

F) the housing being an emotor housing, and the shaft supporting a rotor of the emotor;

G) the press-fit retainer having a coefficient of thermal expansion that is equal to or greater than a coefficient of thermal expansion of the rolling bearing and the housing;

H) the housing is a center housing that contains an emotor and the center housing is connected to at least one of a differential housing or an axle housing; or I) the press-fit retainer has a radial height that extends radially inwardly past a chamfer end point where a chamfer on an end face of the snap ring reaches a radial plane of the end face.

One or more of the above features can be combined to provide an assembly, and in particular an eAxle with improved performance.

BRIEF DESCRIPTION OF THE DRAWING(S)

The foregoing Summary as well as the following Detailed Description will be best understood when read in conjunction with the appended drawings, which illustrate an embodiment according to the disclosure. In the drawings.

DETAILED DESCRIPTION

Certain terminology is used in the following description for convenience only and is not limiting. "Axial" refers to a direction along an axis. A reference to a list of items that are cited as "at least one of a, b, or c" (where a, b, and c represent the items being listed) means any single one of the items a, b, or c, or combinations thereof. The terms "generally", "about" and "approximately" are to be construed as within 10% of a stated value or ratio. The terminology includes the words specifically noted above, derivatives thereof, and words of similar import.

Figure 1:
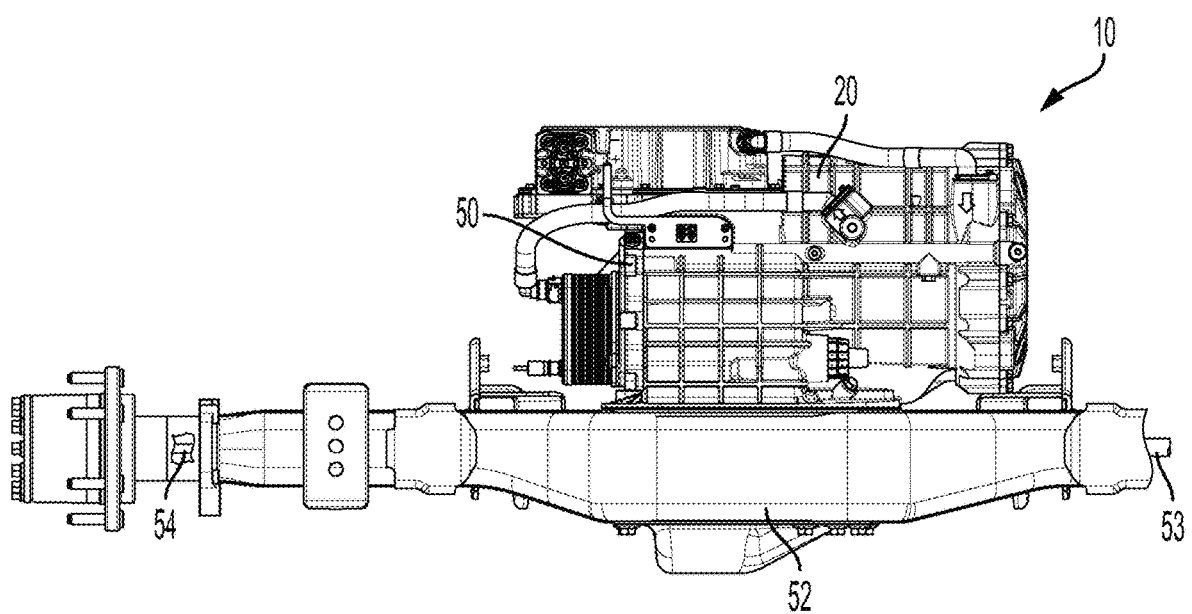
FIG. 1 is schematic view showing an eAxle in accordance with an embodiment of the present disclosure.

Referring to FIG. 1, an exemplary eAxle assembly 10 is shown with which the improvements according to the present disclosure can be utilized. The eAxle assembly 10 includes a center housing 20 which houses an emotor 14, shown in further detail in FIG. 2, as well as a differential housing 50, an axle housing 52 as well as axles 53, 54 which are used to transmit power from the emotor to the wheels, not shown.

In accordance with one embodiment, the housing 20 is the center housing which includes the emotor 14. However, it could be a housing in another gear assembly.

Figure 2:
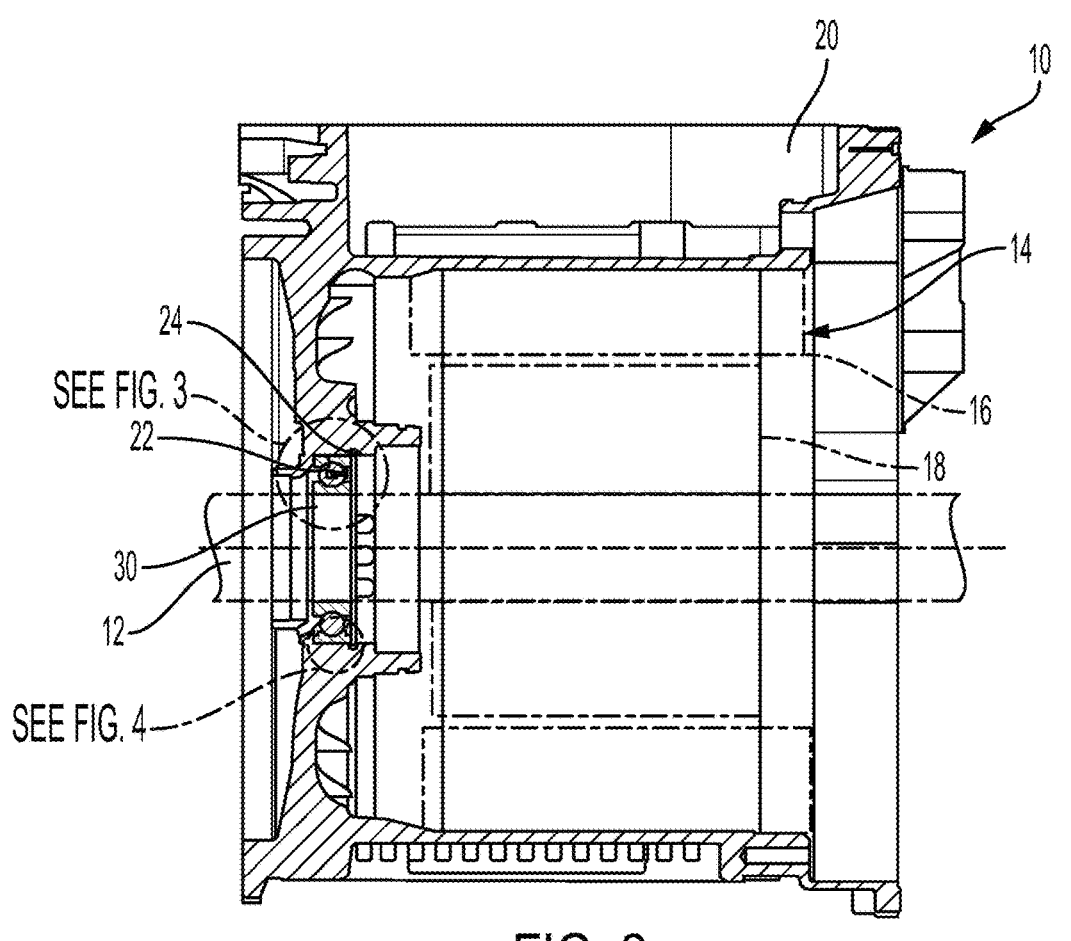
FIG. 2 is a cross-sectional view through a housing which can be of an eAxle assembly as shown in FIG. 1 or another gear assembly which includes the bearing seat and bearing, a snap ring located in a snap ring groove to maintain a position of the bearing within the housing as well as the press-fit retainer according to the disclosure that supports the snap ring.
Figure 3:
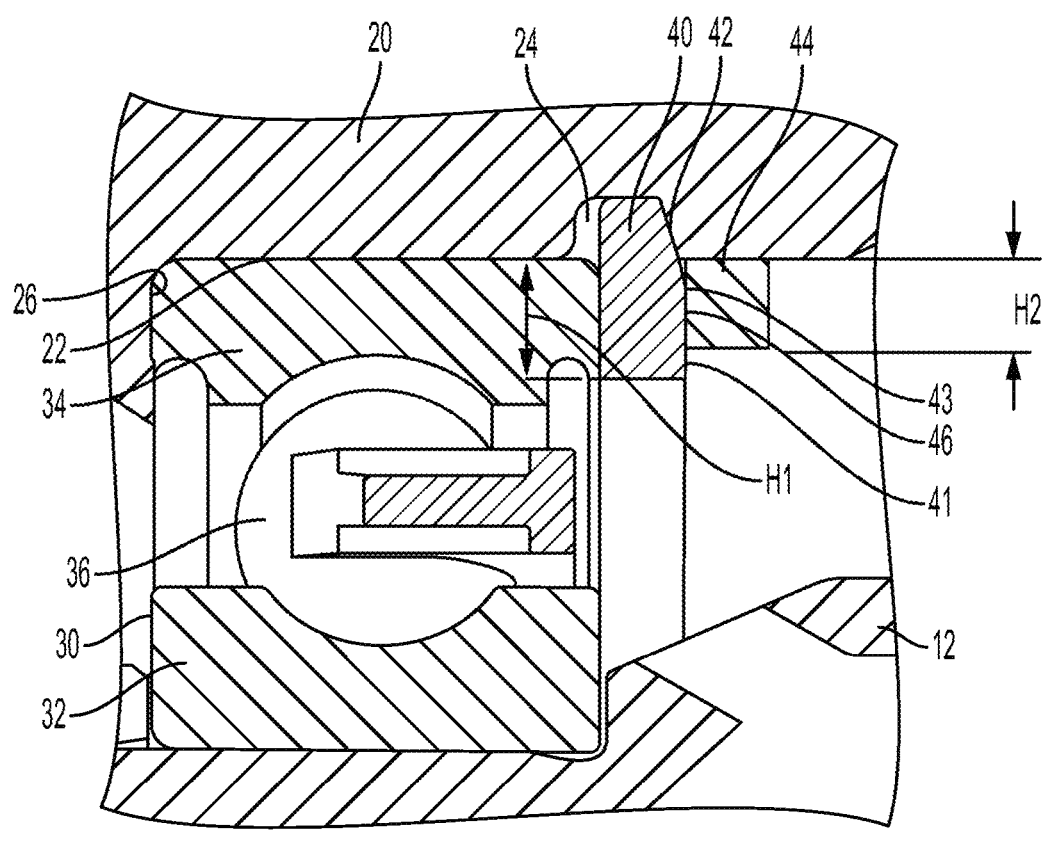
FIG. 3 is an enlarged detail taken from FIG. 2 in the indicated area to show the press-fit retainer, the snap ring, the bearing, and the housing in an assembled state.

Referring now to FIGS. 2 and 3, the housing 20 has a bearing seat 22 and a snap ring groove 24. A rolling bearing 30 is located on the bearing seat 22 adjacent to the snap ring groove 24. The rolling bearing 30 may be a ball bearing and include an inner ring 32, an outer ring 34 as well as bearing balls 36 between the inner and outer rings 32, 34. The snap ring 40 is located in the snap ring groove 24, and the snap ring 40 extends radially along a portion of the rolling bearing 30. A press-fit retainer 44 is engaged on the housing 20 with a press-fit on an axially opposite side of the snap ring 40 from the rolling bearing 30 to support the snap ring 40. Preferably, a sidewall 46 of the press-fit retainer 44 is in contact with a facing side of the snap ring 40. Additionally, the press-fit retainer 44 can provide for positive contact between the elements in the stack from a locating wall 26 in the housing 20 for the rolling bearing 30, the outer ring 34 of the rolling bearing 30, the snap ring 40 and the press-fit retainer 44.

The press-fit retainer 44 is annular and includes the side wall 46 that extends above the bearing seat 22, as shown in detail in FIG. 3. The side wall 46 has a radial height H2 that extends at least 50% of a radial height H1 of the outer bearing ring 34. In some embodiments, the side wall 46 extends at least 70% of the radial height H1 of the outer bearing ring 34 and may extend 100% or more of the radial height H1 of the outer bearing ring 34.

Figure 4:
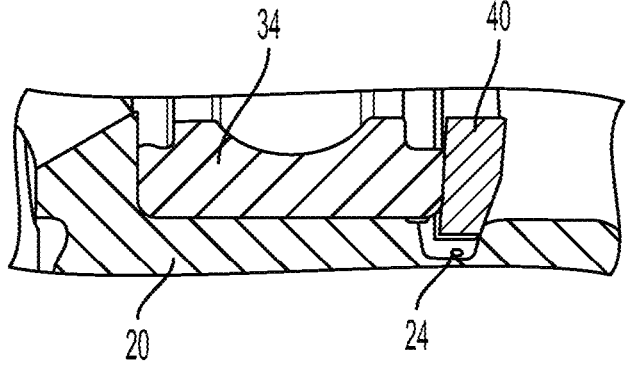
FIG. 4 is an enlarged detail taken from FIG. 2 showing the deflection of a snap ring caused by an axial load on the shaft in the arrangement without the press-fit retainer.

In one embodiment that is also explained with respect to FIG. 4, snap ring 40 has an end face 41 that includes a chamfer 42, with the chamfer 42 being received in the snap ring groove 24. Here, the side wall 46 of the press-fit retainer 44 has a radial height H2 that extends radially inwardly past a chamfer end point 43 where the chamfer 42 reaches a radial plane of the end face 41 so that the press-fit retainer 44 radially overlaps the chamfer end point 43 at all times.

With this arrangement, in the event of an axial load on the shaft 12, for example due to Ice Clunk, axial deflection of the snap ring 40 is prevented due to contact with the press-fit retainer 44.

As shown in FIG. 4, when the press-fit retainer 44 is not provided, the snap ring 40 can bow or flex in the axial direction potentially allowing movement of the shaft 12 in the axial direction. Further, depending upon the axial load on the shaft 12, the snap ring 40 may be dislocated from the snap ring groove 24.

The press-fit retainer 44 is made of aluminum or an aluminum alloy. However, other materials may be used, depending upon the specific construction and material for the housing 20.

As shown schematically in FIG. 2 in the illustrated application where the assembly 10 is an eAxle assembly, the housing 20 is an emotor housing 20 and the shaft 12 supports a rotor 18 of an emotor 14. The stator 16 is also shown located within the housing 20.

In operation, heat may build up in the housing 20. In order to ensure that the press-fit retainer 44 does not become loose or disengaged, the press-fit retainer 44 has a coefficient of thermal expansion that is equal to or greater than a coefficient of thermal expansion of the rolling bearing 30 as well as the housing 20. This ensures that any heat induced expansion of the press-fit retainer 44 is greater than that of the rolling bearing 30 and the housing 20 so that the press-fit retainer 44 is maintained securely in position.

In another aspect, a method of assembling an eAxle 10 is provided. The method includes providing the housing 20 having the bearing seat 22 and the snap ring groove 24 as noted above. The method then includes installing the rolling bearing 30 on the bearing seat 22 adjacent to the snap ring groove 24. The method further includes installing the snap ring 40 in the snap ring groove 22, with the snap ring 40 extending radially along a portion of the rolling bearing 30. After installation of the snap ring 40, the method includes press-fitting a press-fit retainer 44 into the housing 20 with a press-fit on an axially opposite side of the snap ring 40 from the rolling bearing 30.

The method may further include one or more of the features noted above, including:

A) the press-fit retainer 40 being annular and including the side wall 46 that extends above the bearing seat 22;

B) the side wall having a radial height H2 that extends at least 50% of the radial height H1 of the outer bearing ring 34;

C) the side wall 46 having a radial height H2 that extends at least 70% of the radial height H1 of the outer bearing ring 34;

D) the press-fit retainer 44 being made of aluminum or an aluminum alloy;

E) supporting the shaft 12 by the rolling bearing 30;

F) the housing 20 being an emotor housing, and the shaft 12 supporting the rotor 18 of the emotor 14;

G) the press-fit retainer 44 having a coefficient of thermal expansion that is equal to or greater than a coefficient of thermal expansion of the rolling bearing 30 and the housing 20;

H) the housing 20 being a center housing that contains the emotor 14 and the center housing 20 is connected to at least one of a differential housing 50 or an axle housing 52; or I) the press-fit retainer 44 has a radial height H2 that extends radially inwardly past a chamfer end point 43 where a chamfer 42 on an end face 41 of the snap ring 40 reaches a radial plane of the end face 41.

Using one or more of the above features provides an assembly, and in particular an eAxle, with improved performance.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein. It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS 10 assembly/eAxle assembly
12 shaft
14 eMotor
16 stator
18 rotor
20 housing/center housing
22 bearing seat
24 snap ring groove
26 locating wall
30 rolling bearing
32 inner ring
34 outer ring
36 balls
40 snap ring
41 end face
42 chamfer
43 chamfer end point
44 press-fit retainer
46 side wall
50 differential housing
52 axle housing
53 axle
54 axle
H1 height
H2 height

The invention claimed is:

1. An assembly, comprising:
a housing having a bearing seat and a snap ring groove;
a rolling bearing located on the bearing seat adjacent to the snap ring groove;
a snap ring located in the snap ring groove, the snap ring extending radially along a portion of the rolling bearing; and
a press-fit retainer engaged to the housing with a press-fit on an axially opposite side of the snap ring from the rolling bearing, wherein the press-fit retainer has a coefficient of thermal expansion that is equal to or greater than a coefficient of thermal expansion of the rolling bearing and the housing.

2. The assembly of claim 1, wherein the press-fit retainer is annular and includes a side wall that extends above the bearing seat, the side wall has a radial height that extends at least 50% of a radial height of an outer bearing ring.

3. The assembly of claim 1, wherein the press-fit retainer is annular and includes a side wall that extends above the bearing seat, the side wall has a radial height that extends at least 70% of a radial height of an outer bearing ring.

4. The assembly of claim 1, wherein the press-fit retainer is made of aluminum or an aluminum alloy.

5. The assembly of claim 1, further comprising a shaft supported by the rolling bearing.

6. The assembly of claim 5, wherein the assembly is an eAxle assembly, the housing is an emotor housing, and the shaft supports a rotor of an emotor.

7. The assembly of claim 1, wherein the assembly is an eAxle assembly, the housing contains an emotor, and the housing is connected to at least one of a differential housing or an axle housing.

8. The assembly of claim 1, wherein the snap ring includes an end face facing the press-fit retainer that includes a chamfer on a radially outer portion of the snap ring.

9. A method of assembling an eAxle, the method comprising:
providing a housing having a bearing seat and a snap ring groove;
installing a rolling bearing on the bearing seat adjacent to the snap ring groove;
installing a snap ring in the snap ring groove, the snap ring extending radially along a portion of the rolling bearing; and
press-fitting a press-fit retainer into the housing with a press-fit on an axially opposite side of the snap ring from the rolling bearing, wherein the press-fit retainer has a coefficient of thermal expansion that is equal to or greater than a coefficient of thermal expansion of the rolling bearing and the housing.

10. The method of claim 9, wherein the press-fit retainer is annular and includes a side wall that extends above the bearing seat, the side wall having a radial height that extends at least 50% of a radial height of an outer bearing ring.

11. The method of claim 9, wherein the press-fit retainer is annular and includes a side wall that extends above the bearing seat, the side wall having a radial height that extends at least 70% of a radial height of an outer bearing ring.

12. The method of claim 9, wherein the press-fit retainer is made of aluminum or an aluminum alloy.

13. The method of claim 9, further comprising supporting a shaft by the rolling bearing.

14. The method of claim 13, wherein the housing is an emotor housing, and the shaft supports a rotor of the emotor.

15. The method of claim 9, wherein the housing contains an emotor, and the method further comprises connecting the housing to at least one of a differential housing or an axle housing.

* * * * *